United States Patent
Vasanth et al.

(10) Patent No.: US 12,008,496 B1
(45) Date of Patent: Jun. 11, 2024

(54) CENTRALIZED FLEET MANAGEMENT SYSTEM FOR OPTIMIZING TASK ASSIGNMENT

(71) Applicant: Amazon Technologies, Inc., Seattle, WA (US)

(72) Inventors: Jai Vasanth, Kirkland, WA (US); Todd Greenwalt, Kirkland, WA (US); Olia Kerzhner, Port Townsend, WA (US); Sarfraz Banglawala, Glastonbury, CT (US); James Plumley, Pelham, NH (US); Anatoly Mitlin, Swampscott, MA (US); Matthew Paul Bell, Newton, MA (US)

(73) Assignee: Amazon Technologies, Inc., Seattle, WA (US)

( * ) Notice: Subject to any disclaimer, the term of this patent is extended or adjusted under 35 U.S.C. 154(b) by 263 days.

(21) Appl. No.: 17/001,283

(22) Filed: Aug. 24, 2020

(51) Int. Cl.
| | |
|---|---|
| *G06Q 10/0631* | (2023.01) |
| *G01C 21/20* | (2006.01) |
| *G05B 19/406* | (2006.01) |
| *G06Q 10/0639* | (2023.01) |
| *G06Q 10/08* | (2024.01) |

(52) U.S. Cl.
CPC ..... *G06Q 10/06312* (2013.01); *G01C 21/206* (2013.01); *G05B 19/406* (2013.01); *G06Q 10/063112* (2013.01); *G06Q 10/063114* (2013.01); *G06Q 10/06316* (2013.01); *G06Q 10/06398* (2013.01); *G06Q 10/08* (2013.01); *G05B 2219/40361* (2013.01)

(58) Field of Classification Search
None
See application file for complete search history.

(56) References Cited

U.S. PATENT DOCUMENTS

| | | | | |
|---|---|---|---|---|
| 8,306,840 | B2 * | 11/2012 | Cohen | G06F 9/5005 705/7.21 |
| 10,032,137 | B2 * | 7/2018 | Skiba | B25J 9/1689 |
| 10,558,944 | B1 * | 2/2020 | Elazary | G06Q 10/087 |
| 10,860,750 | B2 * | 12/2020 | Wang | G06F 30/13 |
| 2014/0249676 | A1 * | 9/2014 | Florencio | G06N 3/008 700/258 |
| 2014/0365258 | A1 * | 12/2014 | Vestal | G05D 1/0297 901/1 |
| 2017/0050321 | A1 * | 2/2017 | Look | G06Q 10/06398 |

(Continued)

*Primary Examiner* — Folashade Anderson
(74) *Attorney, Agent, or Firm* — Lee & Hayes, P.C.

(57) ABSTRACT

A fleet management system may create and manage tasks within an environment associated with fulfilling, sorting, inducting, and/or distributing packages, such as a warehouse, packaging facility, sortation center, or distribution center. The fleet management system may assign the tasks to agents within the environment. Each of the agents may have capabilities or tasks that the agents are configured to perform and the fleet management system may use these capabilities to assign the tasks to the agents. Additionally, tasks may be assigned based on a location of the agents within the environment. As tasks are generated, the fleet management system may determine a suitable agent to perform the task and may transmit instructions to the agent for carrying out the task. The fleet management system may provide a centralized platform to manage agents, optimize the assignment of tasks, and increase productivity within the environments.

20 Claims, 7 Drawing Sheets

(56) References Cited

U.S. PATENT DOCUMENTS

| | | | |
|---|---|---|---|
| 2017/0060108 A1* | 3/2017 | Kakhandiki | G06N 20/00 |
| 2017/0282374 A1* | 10/2017 | Matula | B25J 3/00 |
| 2018/0096283 A1* | 4/2018 | Wang | G06Q 10/063112 |
| 2018/0158016 A1* | 6/2018 | Pandya | G05B 19/41895 |
| 2019/0091860 A1* | 3/2019 | Lipay | G06Q 10/0633 |
| 2019/0138973 A1* | 5/2019 | Akella | G06F 16/24568 |
| 2021/0107152 A1* | 4/2021 | Honkote | G05B 19/4183 |
| 2021/0232989 A1* | 7/2021 | Rana | G05B 19/41895 |
| 2021/0334682 A1* | 10/2021 | Darmour | G06N 20/00 |
| 2022/0214663 A1* | 7/2022 | Fadaie | G05B 19/4155 |
| 2022/0324111 A1* | 10/2022 | Wartenberg | B25J 9/1676 |

* cited by examiner

CENTRALIZED FLEET MANAGEMENT SYSTEM FOR OPTIMIZING TASK ASSIGNMENT

BACKGROUND

The development of e-commerce has brought about an increase in order fulfillment, shipping, and distribution. To handle this increase, warehouses, distribution centers, or facilities often utilize systems of automated guided vehicles (AGVs) to perform various tasks. For example, AGVs may move items between stations, stock item(s) using forklifts, transfer item(s) to and from inbound and outbound shipping docks, and so forth. Outfitting facilities with AGVs, or configuring facilities to handle AGVs, often requires substantial modifications to infrastructures. Additionally, these facilities, or existing methods to manage a facility's AGVs are not easily scalable and/or updateable with the advent of new technologies. Furthermore, AGVs may not be well suited to perform certain tasks.

As a result, in some instances, AGVs and human workers may work alongside one another. However, challenges arise to safely and efficiently manage AGVs and human workers within common environments. For example, multiple platforms may be used to separately manage AGVs and human workers, which may prevent the realization of expected operational performance.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference number in different figures indicates similar or identical items. The systems depicted in the accompanying figures are not to scale and components within the figures may be depicted not to scale with each other.

DETAILED DESCRIPTION

Figure 1:
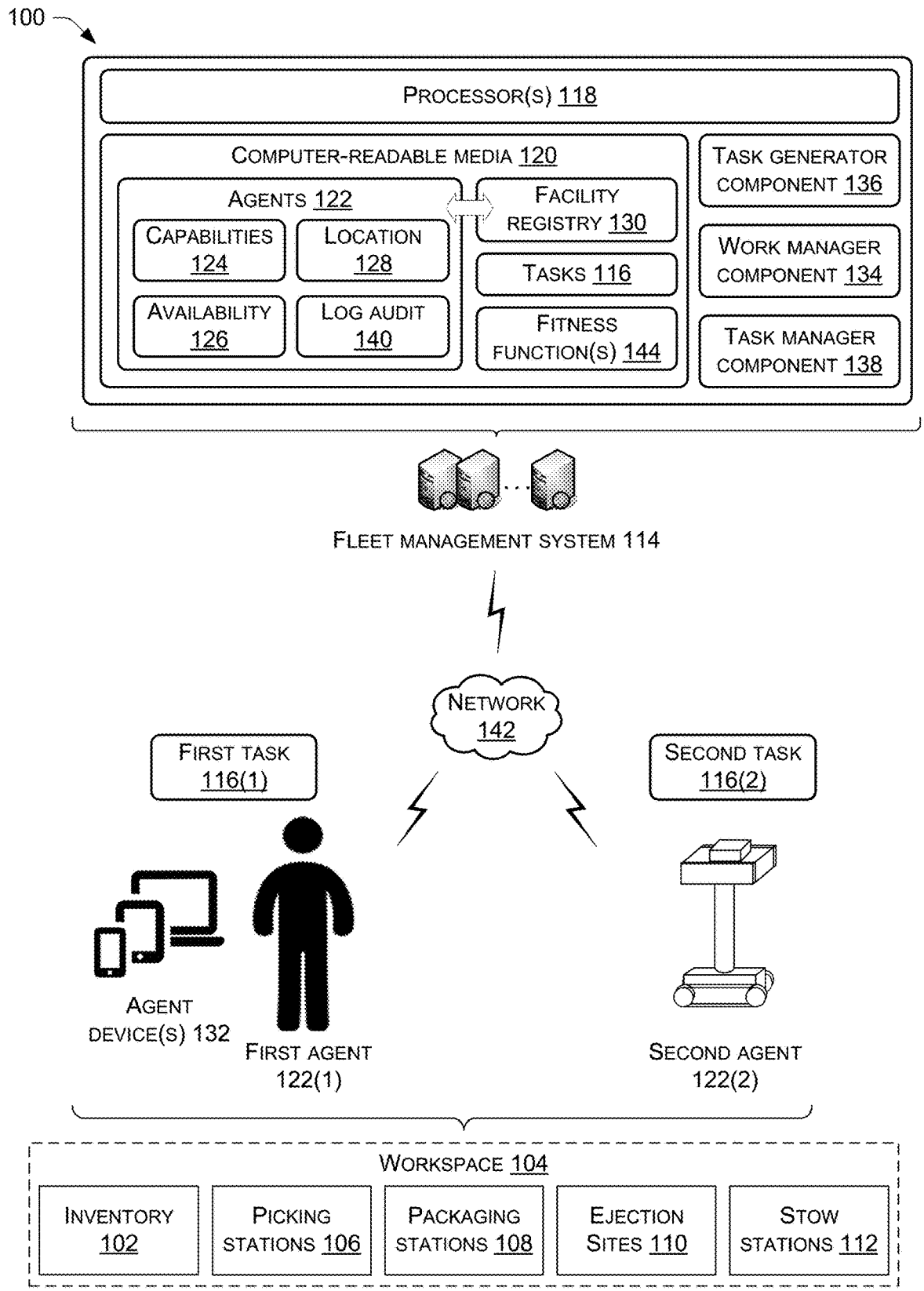
FIG. 1 illustrates an example environment for assigning tasks to agents, according to an embodiment of the present disclosure. Agents may be utilized within the environment for performing various tasks. As tasks are generated, a fleet management system manages the agents and selects which agents is to perform the task. Therein, instructions may be transmitted to the agent, or a device of the agent, indicating the task and instructions associated with the task.

Described herein are, among other things, systems and methods for optimizing an assignment of tasks within an environment associated with fulfilling, sorting, inducting, and/or distributing items and/or packages that contain items, such as a warehouse, packaging facility, sortation center, or distribution center. In some instances, a fleet management system may create and manage tasks within the environment and assign the tasks to one or more agents. The agents may include both human agents and robotic agents, each of which may have certain abilities. The fleet management system may use these abilities to assign the tasks to agents that are most able or capable to perform the task. For example, human agents may be better suited to perform certain tasks (e.g., picking items) while robotic agents may be better suited to perform other tasks (e.g., moving pallets). Additionally, tasks may be assigned based on a location of the agents within the environment. Correspondingly, as tasks are generated the fleet management system may determine which agent is to perform the task and may transmit instructions to the agent to carry out the task. The fleet management system may therefore provide a centralized platform to manage agents, optimize the assignment of tasks, and increase productivity. Such a system may safely and efficiently allow humans and robots to collaborate within common environments In some instances, and as discussed herein, the fleet management system may find use in facilities where order(s) are fulfilled, packaged, and/or shipped. However, it is to be understood that the fleet management system may find use in other environments, or facilities, for managing human agents and/or robotic agents. As orders are placed and/or received, the orders may be processed and fulfilled. For example, item(s) within the order may be located or picked by pulling the item(s) off shelves, out of bins, etc. The item(s) may then travel, whether by a conveyor system, robotic drive units, or with the assistance of the agents, to a packaging station where the item(s) are packaged into packages (e.g., boxes, bags, envelopes, etc.). After packaging, the packages may move through multiple subsequent processes at the same facility, or at additional facilities. For example, within the facility, the packages may be sorted for shipment and/or delivery, whether to the customer or one or more additional facilities.

Throughout the course of fulfilling orders various tasks are performed (e.g., picking, packaging, etc.) and the fleet management system may be configured to handle these varying tasks. For example, the fleet management system may generate and/or receive a variety of tasks associated with order fulfillment. These tasks may be generated according to pre-configured fulfillment processes. For example, during order fulfillment, the fleet management system may generate tasks associated with, or corresponding to, picking item(s) within the facility, delivering the item(s) to packaging station(s), packaging the item(s), transferring the item(s) for shipment, and so forth. The task(s) may also include delivering boxes to packaging station(s), moving pallets of item(s), restocking item(s), supplying tote(s), replacing shipping container(s) or bins, and so forth. However, the task(s) may not be directly related to order fulfillment, but may more generally include any task performable in the facility (e.g., cleaning, maintenance, moving item(s), etc.). The fleet management system may also receive task(s) from other systems, devices, or applications operating in the facility or external to the facility. For example, the fleet management system may receive task(s) from an order fulfillment system that generates task(s) for fulfilling orders.

The tasks may also be generated ad hoc, such as in response to requests from the agents. For example, human agents may request tote(s) at a picking station. As an additional example, at a packaging station, human agents may request that emptied totes be removed (i.e., after the item(s) are removed from the tote and packaged). The robotic agents may also generate and/or request tasks. Ad hoc tasks may also correspond to those tasks that are generated at random, or on an as needed basis. These sort of tasks are difficult to plan and the increase and decrease in fluctuation may lead to underutilization or overutilization of resources.

As task(s) are generated and/or received, the fleet management system assigns the task(s) to the agents. The fleet management system serves to streamline the time-sensitive nature of scheduling, assigning, and monitoring the tasks and may include components that automatically match the tasks to the agents. Unless otherwise specified, the human agents and the robotic agents may be referred to herein as "the agents."

The human agents may include human workers, staff, or personnel that work within the facility. The robotic agents may include AGVs, autonomous mobile robots (AMRs), robotic drives, or other robotic systems or devices that are configured to be controlled and/or instructed to perform certain tasks, whether autonomously or with the aid of human involvement. The robotic agents may also include various components and hardware. For example, the robotic agents may include lifting mechanisms (e.g., scissor lift, pallet jack, etc.), drive mechanisms (e.g., tracks, wheels, etc.), navigational systems (e.g., vision imaging, radar, etc.), and so forth. The robotic agents may also include pneumatics, hydraulics, motors, gears, batteries, controllers, and/or other components that power or control an operation of the robotic agent. In some instances, the human agents and the robotic agents may perform different tasks, similar tasks, or the robotic agents may perform a subset of the tasks performable by the human agents.

As each agent may have different characteristics, the fleet management system may maintain a database of the agents and store data indicating task(s) that the agent(s), respectively, are configured to perform. The fleet management system may also store information about capabilities, availability, location, or other information of the agents useful in assigning the tasks. By way of example, capabilities may include lifting capacity (e.g., weight), carrying capacity (e.g., size/volume), manipulators (e.g., lifts, arms, tilts, etc.), and so forth. Some agents may include more capabilities that others and not all agent(s) may have the same capabilities. Such information may be utilized when assigning task(s) and/or otherwise determining which agent(s) is/are able to perform the task(s). For example, a robotic agent may be characterized as a pallet jack configured to move pallets, and may have a lift and wheel to move the pallet jack. When a task includes moving a pallet (e.g., load a shipping vehicle), the fleet management system may utilize this characteristic of the robotic agent when assigning the task. Alternatively, the pallet jack may not find use in instances where the task involves picking item(s) from inventory.

The fleet management system may utilize any number of characteristics when assigning the tasks. For example, the fleet management system may factor in a location of the agent(s) within the facility when assigning task(s). The location may be used to determine a closest agent to the task being assigned, or where the task is to be completed within the facility, for carrying out the task in a timely manner. In some instances, the fleet management system may store a current location of the agent(s) within the facility, and based on the location, the fleet management system may determine which agent is able to accomplish the task in the least amount of time. In some instances, the fleet management system may maintain a real-time geographical database of the various locations of the agents and/or locations corresponding to the task at hand. The real-time geographical location may be determined from monitoring the agents, receiving indications from the agents, or in other manners.

In some instances, and as part of assigning the tasks, the fleet management system may utilize one or more function(s) and/or machine learning (ML) models. These functions may factor in the capabilities, location, availability, etc. The functions may be configured according to certain parameters, the specific facility, tasks, and may weigh certain characteristics more heavily than others, or in relation to one another. For example, if time is of the necessity, the fleet management system may select an agent who can most quickly complete the task. Additionally, the fleet management system may assign the task to the most cost-effective agent. In some instances, the fleet management system may assign the task in order to distribute the task equally among the agents. In some instances, these function(s) or criteria may be utilized to rank or sort through those agent(s) that are able to perform the task and more than one of the criteria may be considered (e.g., cost-effective and timeliest). For example, after determining which agents are available and capable of performing the task, the fleet management system may rank or select an agent based on cost, time, safety, distribution, and so forth. However, other function(s) or variables may be used to sort or otherwise rank the agents for assigning the task (e.g., travel route, experience of agent, idle-time, etc.). As such, the function(s) used to select the agents assigned to the task may be varied to allow facilities to optimize the assignment of tasks, according to different criteria. Moreover, the fleet management system may be scalable or configurable to accept different inputs, or desired characteristics, when assigning tasks. As such, the selection of the agents may be configurable according to certain needs, workload, and resources in the environment.

After assigning the task(s), or after determining which agent is to perform the task, the fleet management system (or a component thereof) may transmit an instruction or indication to the agent. The agent may include interfaces or devices that are configured to communicatively couple to the fleet management system, other agent(s), and/or other device(s). The human agents may carry (or have on their person) personal devices (e.g., phone, tablet, scanner, etc.) that are configured to receive the task(s) from the fleet management system. The devices of the human agents may include user interfaces that allow the human agents to view their assigned tasks, schedules, and so forth. The robotic agents may include interfaces configured to receive, decipher, and process the task(s) from the fleet management system. Upon receipt, in some instances, the agents may transmit an acknowledgement that indicates an acceptance of the task or that the agent is available and/or capable to carry out the task. However, the tasks may also be automatically assigned to the agents by the fleet management system.

The instructions transmitted to the agent(s) (or the agent device(s)) may include location(s) of where the agent is to travel within the environment, and at each location, the specific task to be performed. For example, the instructions may specify where in the facility the agent is to travel to and pick item(s) and where the agent is to deliver the picked item(s). However, it is to be understood that the instructions may be specific to the task(s) being performed and are consumable by the agents (whether a human agent or robotic agent) in order for the agent to perform the task. Additionally, or alternatively, in the case of robotic agents, the agents may include pre-programmed instructions for performing the task(s). For example, lifting pallets may include pre-programmed instructions of when to drive, lift, release, and so forth. The human agent(s), meanwhile, may utilize their memory or training when performing the tasks, or may be guided by instructions on their device.

After completing the task(s), the fleet management system may receive an indication, whether by tracking the agent and/or as sent from the agent. In response, the fleet management system may delete the task, mark the task as completed, or indicate that the task was otherwise performed. In some instances, the fleet management system may track a performance of the task while in progress or upon being completed. For example, the fleet management system may determine how long it took for the task to be completed, inefficiencies in performing the task(s) (e.g., miss picked item(s), inefficient routes, etc.), or a success rate in performing the task(s). These performance metrics may be used for re-assigning task(s) or assigning tasks in future instances. In this sense, the fleet management system may utilize feedback or performance metrics for assigning tasks in the future. This may optimize the assignment of task(s) such that the agent(s) are assigned task(s) they are particularly well suited to perform, or which they are more adept to perform. Along these lines, however, the fleet management system may receive or utilize other information useful in optimizing the assignment of the tasks(s). As such, the fleet management system may dynamically assign task(s) across the agent(s) and depending on agent(s) that are more capable of efficiently and effectively performing the task(s).

Moreover, the performance of the agent(s) may be tracked and monitored to better understand demand within the facility. Through separating tasks and having agents be cross-functional and capable of performing a multitude of tasks, the fleet management system may use the agents to adapt to changing demands (e.g., ad hoc tasks). Tracking the robotic agents, and controlling their movement, also facilitates determining paths or routes that minimize interactions with human agents.

The fleet management system may also monitor the progress of the tasks, or the agent(s), for re-assigning future tasks. For example, an agent may be assigned to complete a first task and thereafter assigned to complete a second task. Tracking a progress of the first task may allow the fleet management system to determine whether the agent will be able to complete the second task on time (or within an acceptable amount of time). To prevent delay of the second task being completed, the fleet management system may determine another agent that is capable of performing the second task. Such reassignment may ensure that tasks are completed on time. Furthermore, by tracking the agent, the fleet management system may determine the tasks that the agent may perform, and which are proximately located to the agent.

The use of robotic agents may also be modeled or simulated within environments for understanding their practicality. For example, before deploying robotic agents within the facility, their performance and/or use may be simulated. Such process allows for innovations in process automation and robotic technology. For example, human agents may supplement or perform task(s) that robotic agents are not yet capable of performing, while robotic agents may supplement or perform less skilled tasks.

Although discussed herein as finding use in facilitates in which order(s) are packaged for delivery, the fleet management system may find use in other environments that utilize agents, or other fleets, for carrying out and/or performing tasks. For example, the fleet management system may be used at or in induction centers, air gateways, air hubs, delivery centers, cross-docking centers, distribution centers, handling facilities, processing facilities, or other environments in which item(s) are picked, order(s) are fulfilled, and/or packages are sorted for delivery and/or distribution to multiple locations.

In light of the above, the fleet management system may coordinate the assignment of tasks within the facility amongst various types of agents. This coordination may choreograph the movement of agents within the facility such that human agents and robotic agents are able to efficiently, effectively, and safely work alongside one another. For example, the fleet management system may address challenges arising from simultaneously completing large numbers of packing, storing, and other inventory-related tasks. The fleet management system may respond to large numbers of diverse requests to efficiently utilize resources, such as space, equipment, and manpower, to result in higher throughout, reduce response times, and lessen or eliminate backlogs of unfinished tasks. The centralized control of agents also allows for increased productivity, consistent assignment, the time-sensitive nature of assigning the tasks automates matching agents to tasks and increases efficiency. Such assignment may allocate tasks to those agent(s) that are best suited to perform certain task(s). In some instances, the automatic assignment of tasks may reduce an amount of communication between platforms, databases, and/or computing resources that manage operations. For example, storing information regarding the agent(s), the capabilities of the agent(s), and the task(s) in a centralized database may reduce an amount of time to determine compatible agent(s) for assigning tasks. Such process also reduces the use of computing resources, or the communication between computing resources, to either confirm and assign the tasks. The fleet management system may also scale to integrate newer technologies, capabilities of the agent(s), floor plans of facilities, or on an as need basis to handle increased and/or decreased task amounts. As a result, facilities may efficiently scale to handle increased tasks and/or monitor a performance or availability of the agents.

The present disclosure provides an overall understanding of the principles of the structure, function, device, and system disclosed herein. One or more examples of the present disclosure are illustrated in the accompanying drawings. Those of ordinary skill in the art will understand and appreciate that the devices, the systems, and/or the methods specifically described herein and illustrated in the accompanying drawings are non-limiting embodiments. The features illustrated or described in connection with one embodiment, or instance, may be combined with the features of other embodiments or instances. Such modifications and variations are intended to be included within the scope of the disclosure and appended claims.

FIG. 1 illustrates an example environment 100 according to an embodiment of the present disclosure. In some instances, the environment 100 may correspond to an order fulfillment center or facility in which orders are sorted or otherwise fulfilled, processed, and/or categorized for shipment.

In some instances, the environment 100 may include inventory 102 located within a workspace 104. Generally, the inventory 102 stores an inventory of items (e.g., clothing, electronics, toys, household goods, etc.). In some instances, the items may be stored in bins, slots, shelves, containers, crates, stalls, racks, etc. In some instances, the inventory 102 may be dispersed about the workspace 104, or may be located in dedicated areas of the workspace 104 (e.g., perimeter). Additionally, or alternatively, in some instances, the inventory 102 may be located separate from the environment 100. Furthermore, in some instances, the environment 100 may not include the inventory 102, such as in a sortation center or cross-docking station. Here, the environment 100 may receive previously packaged items for further sortation and/or delivery to a variety of destinations.

As shown, in some instances, the workspace 104 or the environment 100 may include picking stations 106, packaging stations 108, ejection sites 110, and/or stow stations 112. At the picking stations 106, item(s) of the inventory 102 may be picked or assigned to be picked. For example, at the picking stations 106, picked item(s) may be organized, managed, and/or grouped. Once picked, the item(s) may be transferred to the packaging stations 108 where the item(s) are packaged into packages (e.g., boxes, bags, envelopes, etc.). From the packaging stations 108, the item(s) (e.g., packaged order) may travel to the ejection sites 110, or induct stations, where the packages are inducted for shipment to the customer or other facilities. In some instances, the environment 100 may include chutes, conveyors, belts, rollers, or other mechanisms for transferring the item(s) between the picking stations 106, the packaging stations 108, and/or the ejection sites 110. In some instances, the items or packages may be transferred from the picking stations 106 to the packaging station 108 using tote(s) and which are configured to move on the conveyors, belts, rollers, etc.

At the stow stations 112, item(s) may be stowed as the inventory 102. For example, at the stow stations 112, the item(s) may be placed on shelves, bins, etc. The environment 100 may also include other stations, such as other workstations, loading docks, cargo compartments, etc. for carrying out operations within the environment 100. In some instances, the picking stations 106, packaging stations 108, and/or the stow stations 112 may be referred to simply as "the stations." Also, while the workspace 104 may be enclosed in the environment 100, alternatively, the workspace 104 may be located outdoors. Moreover, in some instances, the workspace 104 may include multiple areas that are physically separated from one another, including but not limited to separate floors, rooms, buildings, etc.

The environment 100 may include a fleet management system 114 for coordinating the assignment of task(s) 116 associated with managing, packaging, fulfilling, and/or shipping packages. For example, during an order fulfillment, the fleet management system may assign tasks of picking item(s) and/or packing items. As shown, the fleet management system 114 may include processor(s) 118 and computer-readable media 120, where the processor(s) 118 may perform various functions and operations associated with assigning the tasks 116 and the computer-readable media 120 may store instructions executable by the processor(s) 118 to perform the operations described herein.

The fleet management system 114 may maintain or store a database of agents 122 that are utilized to perform the tasks 116, or which the fleet management system 114 is configured to utilize to assign the tasks 116. In some instances, the agents 122 may include human agents and/or robotic agents (e.g., AGVs). In some instances, as referred to herein, "the agents 122" may refer to both, or one of, human agents and robotic agents, unless otherwise noted. The robotic agents may include any device or component appropriate for use in the environment 100. In some instances, the robotic agents may be self-powered, wheeled devices configured to move autonomously within the environment 100 and without direct human supervision. The robotic agents may be powered, propelled, and controlled in any manner appropriate.

Each of the agents 122 may have various characteristics, abilities, or skillsets. For example, depending on the specific agent 122, the agent 122 may perform, or be capable of performing, certain tasks of the tasks 116. FIG. 1 illustrates that the agents 122 may be stored in association with, or include capabilities 124, availability 126, and/or location 128. In some instances, and as discussed in detail herein, the capabilities 124, the availability 126, and/or the location 128 may be used for determining which agent 122 is to perform the task 116.

In some instances, the capabilities 124 may include abilities of the agent 122 for use in determining whether the agent 122 is capable of performing a task 116. In some instances, the capabilities 124 may be unique to the agent 122 and may include, or relate to, certain functional characteristics of the agents 122 or identify those tasks the agent 122 is configured to or capable of performing. For example, in the case of a human agent, the capabilities 124 may indicate certifications (e.g., fork lift operator), lifting capacities (e.g., weight, volume, height, etc.), role (e.g., picker, packer, etc.). For robotic agents, as the robotic agents may include different mechanical components, such as arms, manipulators (e.g., end effectors, robotic arms, etc.), drives, conveyor belts, lifts, jacks, actuators, platforms, payload carriers, trailers, and so forth, the capabilities 124 may indicate tasks which the robotic agent may perform. That is, the capabilities 124 of the robotic agents may be dictated by the hardware or components of the robotic agents. The capabilities 124 may also indicate (e.g., weight, volume, size, etc.), obstacle avoidance capabilities, gripping capabilities, ability to traverse inclines, size (e.g., weight, height, etc.), battery life, etc. Certain robotic agents may also be limited to accessing certain areas of the environment 100, and the capabilities 124 may indicate whether the robotic agent may traverse areas associated with carrying out the tasks 116.

As each of the agents 122 have different capabilities, each of the agents 122 may be stored in association with a classifier or identifier used to identify the capabilities 124. By way of example, if the robotic agent is a pallet jack, such indication may be used to determine that the robotic agent is capable of transporting pallets, but may not be capable of picking item(s) from the inventory 102. As such, when assigning tasks 116, the capabilities 124 may factor into determining whether an agent 122 is able to perform a given task.

The availability 126, meanwhile, may relate to an availability of the agent 122, such as whether the agent 122 is preoccupied with other tasks 116, whether the agent 122 is in or out of commission (e.g., charging), whether the agent 122 is awaiting a task, and so forth. In some instances, the availability 126 may be determined by accessing a schedule or calendar associated with the agent 122. The fleet management system 114 may store the availability 126 to determine in real-time whether the agent 122 is available.

The location 128 may correspond to a location of the agent 122 within the environment 100. The location 128 may also indicate, or be associated with, a proximity of the agent 122 to the task 116 being assigned. For example, the tasks 116 may be associated with certain locations in the environment 100 (e.g., moving item(s) from one location to another) and these locations may be used to determine which agent 122 is to perform the task 116 (e.g., closest available). In some instances, the location 128 of the agents 122 may be tracked throughout the environment 100 and/or determined using a global position system (GPS), location sensors, local beacons, spatial grid systems, triangulation systems, camera (s), pinging the agents, and the like.

As each environment 100 may include different layouts, workspaces 104, stations, and/or agents 122, the computer-readable media 120 may store a facility registry 130. In some instances, the facility registry 130 may identify characteristics of the environment 100, such as which agents 122 are configured to perform tasks 116, the number of agents 122, the types of agents 122 (e.g., human and robot), locations of the stations, etc. Information about the environment 100 may be utilized for assigning the tasks 116 and according to the specifics of each environment 100 and the agents 122 utilized therein.

The facility registry 130 or the agents 122 may be registered with the fleet management system 114 during a deployment or update of the fleet management system 114. Similarly, the capabilities 124, availability 126, and/or location 128 may be updated. For example, as the capabilities 124 of the agents 122 change, these capabilities 124 may be updated for use by the fleet management system 114 when assigning the tasks 116. Here, and by way of example, human agents may be trained to operate certain machinery or equipment within the environment 100. Correspondingly their capabilities 124 may be updated. Maintaining the facility registry 130 in this manner permits the fleet management system 114 to use up to date information when assigning the tasks 116. The fleet management system 114 may therefore update in a real-time manner (as necessary or according to a predetermined schedule) to maintain an up to date database. The fleet management system 114 may also be reconfigurable and scalable to existing environments and/or new environments. For example, as new human agents and/or robotic agents are hired and/or commissioned, the fleet management system 114 can assign roles, capabilities 124, etc. for use in assigning the tasks 116 and integrating the agents 122 within the environment 100.

The picking stations 106, the packaging stations 108, the ejection sites 110, and/or the stow stations 112 may be operated or manned entirely or in part by the human agents and/or the robotic agents. At the stations, the agents 122 may be capable of performing certain tasks 116, such as packaging or counting inventory items. The agents 122 may also move about the workspace 104 and/or the environment 100 to perform and carry out their associated tasks 116. Noted above, to assign the tasks 116 throughout the environment 100, the fleet management system 114 may utilize one or more of the capabilities 124, the availability 126, and/or the location 128 for determining or selecting the agent to perform the task 116. For example, the tasks 116 may be varied and certain agents 122 may be better (or more) suited to perform certain tasks 116. In some instances, as order(s) are placed or received, the fleet management system 114 (or another communicatively coupled computing device) may determine the tasks 116 and selects an agent, among the agents 122, to carry out the task 116. After selecting the agent 122, the fleet management system 114 may communicate with the agents 122 to instruct the agent 122 about the task 116 to be completed.

To communicate with one another, the fleet management system 114 and the agents 122 may include respective interfaces. For example, human agents may utilize agent device(s) 132, such as mobile devices, tablets, laptops, computers, scanners, and so forth. Human agents may interact with the agent device(s) 132 for receiving the tasks 116 and knowing which tasks 116 the human agent is to perform, or which tasks 116 have been assigned to the agent 122. The robotic agents, meanwhile, may include interfaces for deciphering the instructions or tasks 116 from the fleet management system 114. The robotic agent may include controllers, or utilize the interfaces, to transmit operational data to the fleet management system 114 and receive commands from the fleet management system 114 that permit the robotic agents to be remotely controlled. In some instances, the robotic agents may also communicatively couple to one another, directly or indirectly, for completing the tasks 116.

In some instances, the fleet management system 114 may communicate with the agent device(s) 132 and/or the robotic agent(s) via a network 142 to provide data associated with the tasks 116. The network 142 may represent any type of communication network, including a data network, and may be implemented using wired infrastructure (e.g., cable, CATS, fiber optic cable, etc.), a wireless infrastructure (e.g., RF, cellular, microwave, satellite, Bluetooth, etc.), and/or other connection protocols.

In some instances, in the case of human agents, detailed instructions or directions may be provided regarding the tasks 116 to be performed. For robotic agents, the robotic agents may be preprogrammed for performing the tasks 116 and according to a specific set of instructions. For example, the programmed instructions may include operations for carrying out tasks 116 associated with moving pallets, stacking inventory, and so forth. Upon receipt of the task 116, the agents 122 may communicate with the fleet management system 114 indicating whether the agent 122 accepts or denies the task 116. In some instances, the agent(s) 122 may not confirm the task 116, or accept the task 116, but the task 116 may be assigned automatically to the agent 122. In some instances, if accepted, the fleet management system 114 may record an indication that the agent 122 is performing the task 116. If denied, the fleet management system 114 may attempt to reassign the task 116 to another capable and available agent 122.

The fleet management system 114 may handle the assignable tasks 116 in an efficient manner based on the current status, configurations, capabilities 124, availability 126, location 128, abilities, etc. of the agents 122. In order to accomplish this, the fleet management system 114 may include various components, modules, and/or engines associated with the generation and/or assignment of the tasks 116. For example, the fleet management system 114 may include a work manager component 134, a task generator component 136, and/or a task manager component 138.

The work manager component 134 may be configured to receive the tasks 116 or requests for the tasks 116 to be assigned (or generated). These requests or the task(s) 116 may be received from the agents 122, the agent devices 132, the stations, or from other components in the environment 100. The work manager component 134 may organize the tasks 116 submitted and may function to translate (e.g., decipher) the incoming requests. The work manager component 134 may also understand the needs of the stations for interpreting the requesting and organizing the tasks 116. In this sense, as tasks 116 are needed to be carried out within the environment 100, the work manager component 134 may identify the tasks 116 and organize the tasks 116 such the tasks are assignable to the agents 122. In some instances, some of the tasks 116 may have higher priorities than others, or may be of more importance than others. In some instances, the work manager component 134 may identify which of the tasks 116 are of a higher priority (e.g., based on the nature of the task 116, the station submitting the task 116, etc.). In some instance, the work manager component 134 may dedupe the requests, or the tasks 116 being received to generate or split a task into multiple subtasks.

The task generator component 136 may pull from the work manager component 134 to generate the specific tasks that are to be carried out. For example, the task 116 or request received by the work manager component 134 may simply identify a need for resources, but the request may not identify specifics associated with carrying out the tasks 116 (e.g., where are the resources located, what are the locations in need of the resources, and so forth). To briefly illustrate, at the stations, the agents 122 (e.g., human agents) may consume resources such as totes, packaging supplies, inventory, and so forth. From time to time, there is a need to replace or restock these resources and the agents 122 may submit requests for resupplying the resources. The task generator component 136 may identify, for each task 116, the operations to be carried out for performing the task 116. The task generator component 136 may also determine requirements associated with the task 116, such as when the task 116 is to be performed, where the task 116 is to be performed within the environment 100, a lifting and/or carrying capacity of the agent 122, and so forth.

The requirements of the task 116 are usable by the task manager component 138 for assigning agents 122 to the task 116, or determining those agents 122 that may fulfill or satisfy the requirements. The task manager component 138 may receive the tasks 116 from the task generator component 136 and may select which agent 122 is to perform the task 116. For example, after the task generator component 136 generates a task, and identifies the operations for performing that task (e.g., locations, time, etc.), the task manager component 138 may utilize the capabilities 124, availability 126, the location 128, and/or other information for determining which of the agents 122 to assign the task 116. The task manager component 138 may utilize one, or several, of the capabilities 124, the availability 126, and/or the location 128 when assigning the tasks 116, and weight and/or prioritize the tasks 116.

Knowing the specifics of the task 116 allows the task manager component 138 to make informed decisions and select a most suitable agent 122 for performing the task 116. For example, the task manager component 138 may assign the task 116 based on which agent 122 is closest to the task 116, a speed of the agent 122 (or time the agent 122 is estimated to complete the task 116), a path taken to complete the task 116 (e.g., which agent 122 has the least congested path), lifting capabilities of the agent 122, and so forth. In some instances, the task manager component 138 may utilize ML models for choosing which tasks 116 are assigned to which agents 122. The use of ML models may optimize the assignment to those agents 122 that are best suited to carry out the given task 116 (e.g., performance metrics).

In some instances, the task manager component 138 may receive a request to assign a particular agent 122 the tasks (e.g., request pallet jack to move pallet) and/or may determine which agent 122 is compatible to handle the task 116. The task manager component 138 may also prioritize the tasks 116 such that some requests or tasks 116 may be handled sooner than others. Such prioritization may be determined via the work manager component 134 and/or the task generator component 136 for use by the fleet management system 114 in selecting the agent 122.

In some instances, the task manager component 138 may select an agent 122 for performing the task 116 based on one or more fitness function(s) 138. In some instances, the fitness function(s) 138 may represent criteria that agents 122 are to be selected. For example, depending on the needs, specifics, or characteristics of the workspace 104, the task manager component 138 may select agents 122 according to a cost, efficiency, time, experience, safety, and so forth. In this sense, the fitness function(s) 144 may include, but are not limited to, a cost fitness function, an efficiency fitness function, a time fitness function, an experience fitness function, and so forth. Each of these fitness function(s) 144 may be optimized according to their specific trait (e.g., time). For example, if time is of the necessity, the task manager component 138 may use the time fitness function to select an agent 122 who can most quickly complete the task 116. If cost is of concern, the task manager component 138 may use the cost fitness function to select an agent 122 who can most resourcefully complete the task 116. In some instances, more than one fitness function 144 may be used to select an agent 122. For example, the task manager component 138 may select an agent 122 based on the agent 122 having the greatest amount of experience and being the timeliest.

In some instances, the fitness function(s) 144 may be utilized to rank those agent(s) 122 that are able to perform the task 116. For example, after determining which agents 122 are available and capable of performing the task 116, the task manager component 138 may rank or select an agent 122 based on cost, time, safety, and so forth. As such, the fitness function(s) 144 used to select the agents 122 assigned to the task 116 may be varied to allow workspaces 104 to optimize the assignment of tasks 116, according to different criteria and needs.

The tasks 116 that are assignable may be accomplished or carried out the by the human agents and/or robotic agents. However, depending on the particular task 116 to be performed, the fleet management system 114 may select one of the agents 122. In this sense, the human agents and the robotic agents are configured to work alongside one another within the environment 100, and the fleet management system 114 may manage the agents 122 performing the tasks 116. In some instances, the tasks 116 may include, but are not limited to, moving totes to the picking stations 106 to permit the agents 122 to pick item(s) from the inventory 102, moving totes from packaging stations 108 after the item(s) are packaged, moving pallets, moving carts, picking ordered items from the inventory 102 (e.g., quantity, location, pick order, etc.), bringing picked item(s) to stations for packaging or preparation for shipment, moving packaged item(s)/orders to the ejection site(s) 110 (e.g., loading dock, shipping platforms, pallets, delivery truck, delivery trailer, etc.), unloading inventory, stowing the inventory 102 (e.g., from pallet or case-sized groups to individual inventory items), counting the inventory 102, picking up objects, transporting objects, dropping off objects, as well as cleaning up (sanitizing or disinfecting) an area.

To illustrate the assignment of the tasks 116, FIG. 1 illustrates a first agent 122(1) and a second agent 122(2). The first agent 122(1) corresponds to a human agent and the second agent 122(2) corresponds to a robotic agent. Noted above, the fleet management system 114 may communicate with the first agent 122(1) via one or more of the agent device(s) 132. The first agent 122(1) may receive a first task 116(1) associated with picking certain item(s) from the inventory 102, for example. As the first agent 122(1) picks item(s), the first agent 122(1) may place the item(s) in a tote. After collecting the item(s), the first agent 122(1) may return to the picking stations 106 to place the tote (with the item(s)) on a conveyor for transport to the packaging station 108. As the first agent 122(1) completes the first task 116(1) of picking the item(s), the first agent 122(1) may move onto pick item(s) for another order. However, throughout this process, the first agent 122 may consume the totes used for picking the item(s). In some instances, the first agent 122(1) may generate a second task 116(2) associated with supplying totes to the first agent 122(1) (or their picking station), or the fleet management system 114 (or another device and/or system) may determine that totes are running low and needed at the picking station 106. In response, the fleet management system 114 (e.g., the task generator component 136) may generate the second task 116(2) associated with supplying the first agent 122(1) with totes and the second task 116(2) may be assigned to another agent, such as the second agent 122(2). The fleet management system 114 (e.g., the task manager component 138) may select the second agent 122(2) for supplying the totes and send the instruction to the second agent 122(2). Therein, the second agent 122(2) may deliver the totes to the first agent 122(1). In this example, the second agent 122(2) may be dispatched and instructed to bring totes to the picking station 106. As part of this process, the task generator component 136 may identify location(s) within the environment 100 where the second agent 122(2) is to pick up the totes for supplying the picking station.

Upon completion of the first task 116(1) and the second task 116(2), respectively, the first agent 122(1) and/or the second agent 122(2) may report back to the fleet management system 114. For example, the first agent 122(1) may use the agent device(s) 132 for confirming that the totes were delivered. Additionally, or alternatively, the second agent 122(2) may transmit an indication that the totes were dropped off at the picking station 106, which may indicate that the second task 116(2) has been completed.

Completed tasks release the agents 122 from their assignment and make them eligible to be assigned more tasks 116. For example, the first agent 122(1) may be assigned a task of restocking inventory and the second agent 122(2) may include a fork lift that assists the first agent 122(1) in restocking the inventory item(s). The fleet management system 114 may identify the second agent 122(2) for picking up and/or transporting inventory item(s) to the inventory 102 whereby the first agent 122(1) may physically restock the inventory item(s). In this sense, the second agent 122(2) may bring the inventory item(s) to the first agent 122(1) at the location where the inventory item(s) are to be restocked. The first agent 122(1) may then transfer the inventory item(s) to the inventory 102. After being unloaded, the second agent 122(2) may be instructed to leave the inventory 102 and travel to other places in the environment 100. In this example, the fleet management system 114 may coordinate the performance of the first task 116(1) and the second task 116(2) such that the first agent 122(1) and the second agent 122(2) may collaboratively work together to accomplish a common goal. In some instances, the fleet management system 114 may assign the first task 116(1) to the first agent 122(1) based on the tasks 116 the first agent 122(1) is more adept to perform, while the second agent 122(2) may be assigned the second task 116(2) the second agent 122(1) based on the tasks 116 the second agent 122(2) is more adept to perform. This process utilizes the strengths of each agent 122 to carry out the tasks 116.

FIG. 1 further illustrates that the computer-readable media 120 may further store or have access to a log audit 140, which may represent performance characteristics of the agents 122. The log audit 140, for example, may store information associated with a time the agents 122 complete the tasks 116, a success rate at which the agents 122 complete the tasks 116, or other information useful in determining a performance in completing the task 116. The log audit 140 may be usable to determine which of the agents 122 are to be assigned particular tasks 116, or which agent 122 (e.g., human agent or robotic agent) the task 116 is assigned. For example, certain agents 122 may be more capable, experienced, or efficient at performing some of the tasks 116. Additionally, some of the agents 122 may lack the capability to perform certain tasks 116 (e.g., transporting pallets, picking items, handling certain inventory, etc.). Using the log audit 140, the fleet management system 114 may model the assignment of certain tasks 116 to certain agents 122 and determine an efficiency associated therewith. By modeling the performance, and receiving updates from tasks 116 as the tasks 116 are completed, the fleet management system 114 may select the more efficient agents 122 for carrying out the tasks 116. For example, modeling the assignment of tasks 116 may indicate that human agents timelier when performing certain tasks, or are better suited to perform certain tasks (e.g., less error rate).

In some instances, the agents 122 may also perform ad hoc tasks within the environment 100 (e.g., ensuring packaging stations 108 have adequate packing material, supplying picking stations 106 with empty totes, removing empty totes from packaging stations 108, etc.). In some instances, ad hoc tasks may represent those tasks 116 that are not directly associated with a particular agents 122 or which do not have specific processes that are performed during routine or scheduled operations. The ad hoc nature of these tasks may introduce challenges to discretize and manage the tasks 116. For example, given the ad hoc nature, these tasks may be generated when necessary, randomly, and with little notice. This makes managing and handling some tasks more difficult than others and may lead to the inability to dynamically assign the agents 122 to the tasks 116. Such problems may lead to overstaffing and/or understaffing. However, by centralizing the management of the agents 122 and the assignment of tasks 116, the fleet management system 114 may respond to these ad hoc tasks by dynamically adapting agent 122 allocation to meet demands.

In some instances, the agents 122 may perform the ad hoc tasks based on visual cues sensed in the environment 100. For example, the agents 122 may traverse about the environment 100 and notice that totes need to be supplied to a picking station 106. The agents 122 may also notice that packaging supplies (e.g., boxes, tape, packing material, etc.) are needed at a packaging station 108. In response, the agents 122 may automatically perform these tasks, and/or may request guidance from the fleet management system 114 for performing such tasks. Still, the fleet management system 114 may notice that an agent is moving by a picking station 106 in need of totes and may assign that agent a task 116 to restock totes.

In some instances, the robotic agents are configured to autonomously navigate and position themselves within the environment 100. In some instances, the robotic agents may include sensors, a communication interface, memory configured to store information, and one or more processors coupled to the sensors and the memory. The robotic agents may also include a drive system for moving the robotic agent within the environment 100. In some instances, the drive system may include wheels, tracks, digit members (e.g., leg-type members), a suspended wiring assembly, motors, propellers, and so forth. In some instances, the robotic agents may facilitate one or more degrees of movement to allow rotation about a vertical axis, rotation about a tilt axis, and/or rotation about a pan axis The robotic agents may also include a guidance system and/or a navigation system communicatively coupled to the drive system to control autonomous movement of the robotic agent within or outside the environment 100. In some instances, the robotic agents may be configured to navigate within the environment 100 using reference markers (e.g., fiducials, infrared markers, QR codes, barcodes, identifiers, etc.) placed periodically along various paths traveled by the robotic agent. Such reference markers may be used to indicate positions of the robotic agents within the environment 100 and may be used by the robotic agents to navigate through the environment 100. Additionally, or alternatively, lights projected onto/into the environment 100 for navigating the robotic agents. In some instances, the robotic agents may be configured to travel within isles or lanes in the environment 100.

However, in some instances, the robotic agents may navigate along uncharted paths using sensors, which may be any device capable of sensing the environment 100 such as depth cameras, color cameras, grey scale cameras, laser ranging devices, sonar devices, radar devices, or combinations thereof. The sensor(s), or other systems may prevent collisions with equipment in the environment 100 and other agents 122. In some instances, the robotic agents may also collectively and collaboratively map the environment 100 as the environment 100 evolves and changes, such that the environment 100 knows how to navigate between locations. In some instances, the robotic agent may travel along unmanned paths, or along paths which human agents utilize.

Controller(s) or circuits of the robotic agents may receive signals to activate and govern operation of functions of the robotic agent, such as forward and backward travel, steering, braking, raising and lowering carriers, gripping, offloading, etc. Introduced above, the robotic agents and/or the agent device(s) 132 may communicate with the fleet management system 114 (or components thereof) wirelessly or in any other appropriate manner. Such communication allows the fleet management system 114 to communicate and receive information associated with the location 128 of the agents 122 and/or to exchange any other suitable information to carry out the operations described herein (e.g., submitting tasks 116). However, as different agents 122 may have different interfaces or communication protocol(s), the fleet management system 114 may be configured with a plurality of technologies to be able to communicate with the agents 122.

The workspace 104 may also include as parking spaces for the robotic agents while they await tasks 116, places for the robotic agents 122 to be recharged or maintained (e.g., maintenance). The workspace 104 may also include areas for storing resources (e.g., supplies consumed in the environment 100). In some instances, the robotic agents may be dispersed throughout the environment 100 for handling tasks 116 as needed, or may travel to a perimeter of the workspace which awaiting tasks 116. However, the fleet management system 114 may spread or equally distribute the robotic agents about the environment to limit an amount of time it takes for the robotic agents to travel to and perform tasks 116.

Although FIG. 1 illustrates the computer-readable media 120 storing or having access to certain information, in some instances, other databases, storage, and/or servers may store such information. For example, a third party database may store information associated with the agents 122 and/or the tasks 116 to be assigned. In such instances, the fleet management system 114 may communicatively couple to these third-party databases for knowing the tasks 116 to be assigned and/or for otherwise assigning the tasks 116 to the agent 122. The fleet management system 114 may therefore operate in conjunction with other platforms or services for carrying out the operations performed herein. Moreover, in some instances, the fleet management system 114 may a software as a service (SaaS) for managing a plurality of facilities. For example, the fleet management system 114 may manage and assign tasks 116 across a plurality of facilities and/or for different entities. In such instances, the fleet management system 114 may communicatively couple to databases of these entities for gaining information about the facility, agents 122, tasks 116, and so forth for use by the fleet management system 114 managing and assigning tasks 116.

As used herein, a processor, such as processor(s) 118 may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

The computer-readable media 120 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Figure 2:
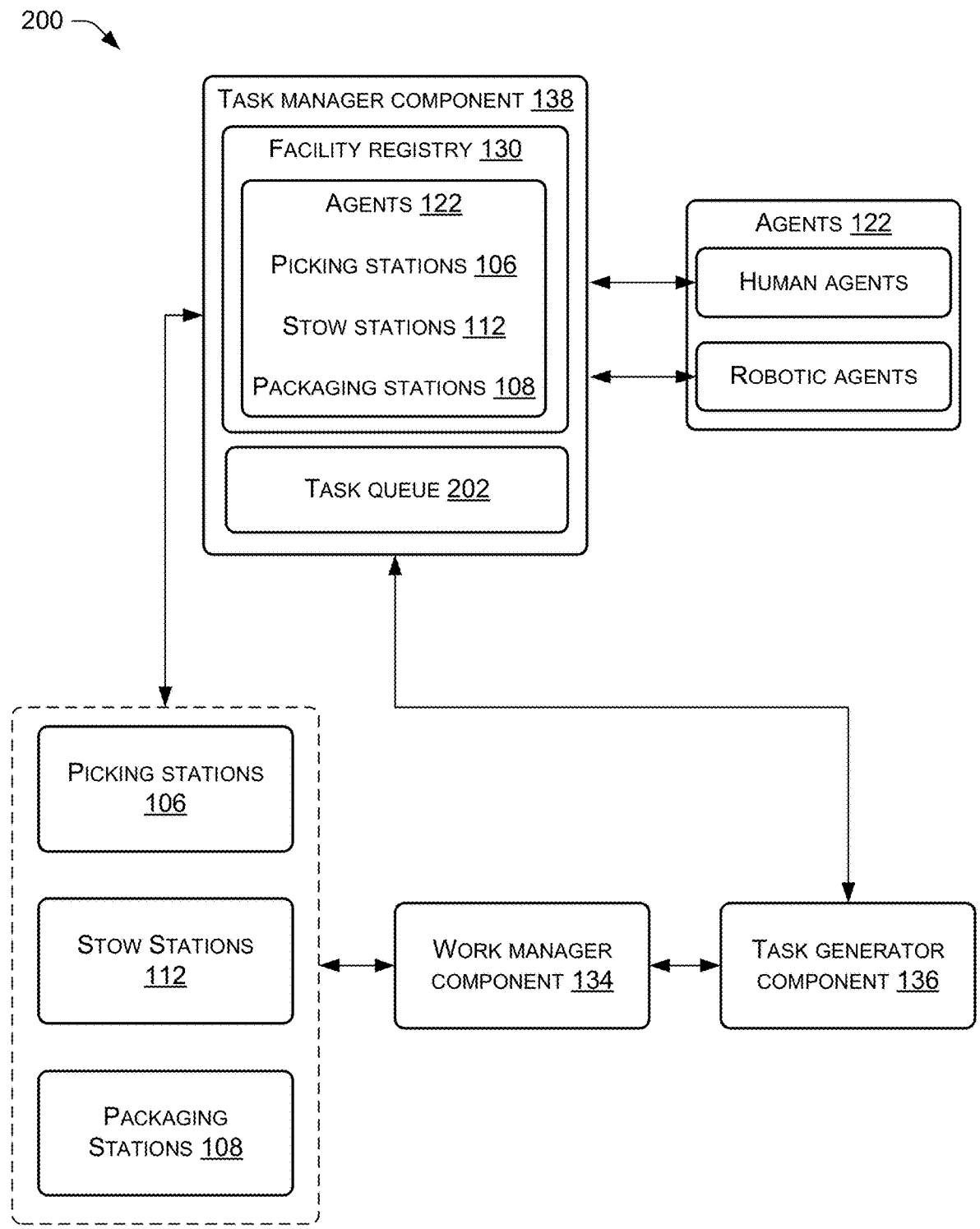
FIG. 2 illustrates an example diagram for managing tasks and assigning tasks to agents within an environment, according to an embodiment of the present disclosure.

FIG. 2 illustrates an example diagram 200, showing additional components or details of the fleet management system 114 and/or components of the fleet management system 114 for carrying out the assignment of tasks 116.

As illustrated, the work manager component 134 may be configured to receive tasks 116 or requests for the tasks 116 to be assigned (or generated). For example, the picking stations 106 may submit a request or task 116 for totes to be supplied, the packaging stations 108 may submit a request for totes to be removed, and/or the stow stations 112 may submit tasks 116 for stowing or placing item(s) in the inventory 102. In some instances, the work manager component 134 may receive the tasks 116 via requests of the agents 122, or the picking stations 106, the packaging stations 108, and/or the stow stations 112 may include components for submitting the tasks 116 or knowing when to submit the tasks 116 (e.g., computer vision, sensors, etc.). In some instances, the picking stations 106, the packaging stations 108, and/or the stow stations 112 (or other stations within the environment 100) may post tasks to the work manager component 134.

As discussed above in FIG. 1, the work manager component 134 may organize the tasks 116 that are submitted. Some of the tasks 116 may have higher priorities than others or may be of more importance than others. The work manager component 134 may serve to identify which of the tasks 116 are of a higher priority (e.g., based on the nature of the task 116, the station submitting the task 116, etc.). In some instances, the work manager component 134 may dedupe the requests or the tasks 116 being received.

Therein the task generator component 136 may pull from the work manager component 134 and generate requests to perform the tasks 116. For example, in some instances, the tasks 116 submitted to the work manager component 134 may generally include a task to supply a picking station with more totes. The task generator component 136 may generate a particular, or specific task, such as moving totes from one location to the picking station 106. In other words, the task generator component 136 may identify where the totes are to be picked up and delivered to.

The tasks 116 may then be sent, or consumed by, the task manager component 138 that assigns and delegates the tasks 116 to the agents 122. The task manager component 138 may be configured to utilize the facility registry 130 for assigning the tasks 116. Among other things, the facility registry 130 may indicate the agents 122 working, or available to perform the tasks 116, the picking stations 106 (e.g., location, amount, etc.), the packaging stations 108 (e.g., location, amount, etc.), and the stow stations (e.g., location, amount, etc.). Additionally, the task manager component 138 may have access to the capabilities 124, the availability 126, and/or the location 128 of the agents 122. This information is used by the task manager component 138 to assign the tasks 116. For example, depending on the task 116, the capabilities 124 of the agents 122, the availability 126 of the agent 122, and/or the location 128 of the agents 122, the task manager component 138 may assign the task 116. In other words, by having access to this information, the task manager component 138 may informatively assign the tasks 116 to the agents 122.

FIG. 2 further illustrates that the task manager component 138 may further have access to, or store, a task queue 202, which may identify the tasks 116 that are in progress, being completed, being assigned, and so forth. The task manager component 138 may be configured to update the task queue 202 as the 116 are assigned and completed. Tasks in the task queue 202 may be assigned to the agents 122 in an efficient manner based on the current statuses, availability, urgency, or capabilities 124 of the agents 122.

Upon determining an agent 122 for which the task 116 is to be assigned, the task manager component 138 may send the task 116, or an instruction to perform the task 116, to the agent 122. The agents 122 may include suitable interfaces for receiving the tasks 116. Discussed above, and as shown in FIG. 2, the agents 122 may include human agents and robotic agents. The task manager component 138 may be configured to communicate with a variety of agent device(s) 132 and/or robotic agents. The task manager component 138, or other portions of the fleet management system 114, may transmit the tasks 116 to the agent device(s) 132 and/or the robotic agents. In some instances, the agents 122 may transmit an acknowledgement that the agent 122 will (or has) accept the task 116, such that the task manager component 138 may update the task queue 202.

Upon completion of the task 116, the task manager component 138 may update the task queue 202 and remove the task 116 from the task queue 202 or otherwise indicate that the task 116 has been completed. Indications may also be transmitted back to the picking stations 106, the packaging stations 108, and/or the stow stations 112 indicating that the tasks 116 have been completed. For example, the work manager component 134 may receive the status update on the tasks 116 from the task generator component 136 and/or the task manager component 138, and reports the status update back to the corresponding station.

As such, the fleet management system 114 is configured to digest all the supply and demand needs from the various stations in the environment 100 and convert them to tasks 116. As part of this process, the fleet management system 114 may utilize information about the agent location, station status, and/or station locations. The fleet management system 114 may also make the optimal choice the agent 122 for carrying out the task 116.

FIGS. 3-7 illustrate various processes related to assigning tasks within an environment. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures, and systems described in the examples herein, such as, for example those described with respect to FIGS. 1 and 2, although the processes may be implemented in a wide variety of other environments, architectures, and systems.

Figure 3:
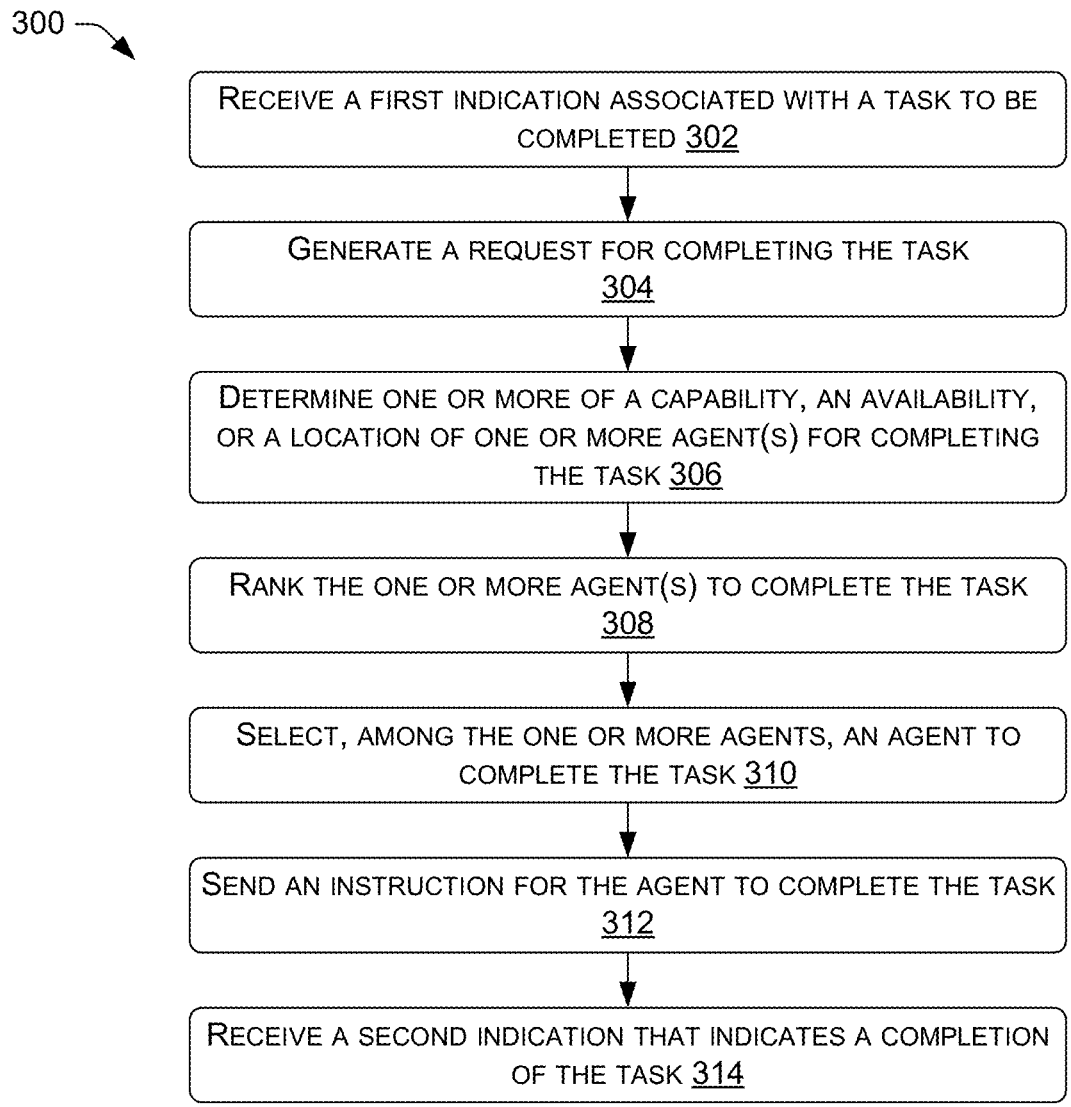
FIG. 3 illustrates an example process for selecting an agent to perform a task, according to an embodiment of the present disclosure.

FIG. 3 illustrates an example process 300 for assigning a task 116 to an agent 122. The process 300 describes a process by which totes are supplied to picking stations 106. For example, picking items at the picking stations 106 may demand a steady stream of totes. The totes may include storage bins capable of holding one or more types of inventory items. The totes may be capable of being carried, rolled, and/or otherwise moved within the environment 100.

At 302, the process 300 may receive a first indication associated with a task to be completed. In some instances, the work manager component 134 may receive a request from the agent 122. In the case that the agent 122 is a human agent, the request may be received via the agent device(s) 132. In some instances, the stations of the environment 100 may submit requests. For example, the picking stations 106 may include a sensor (e.g., imaging senor, weight sensor, etc.) to estimate tote volume at the picking station 106, and based on the estimation, may submit the request for supplying totes (e.g., below a certain threshold). Additionally, or alternatively, the work manager component 134 may determine that the totes are to be supplied and may submit the request. For example, the fleet management system 114 (or components thereof) may keep track of a number of available totes by keeping a tally of the number of totes provided and the number of full totes consumed. In some instances, the agent 122 may explicitly confirm the number of totes they picked up or have used.

In some instances, the first indication may include priorities, location information, or identifiers. For example, the first indication (or the request associated with the task 116) may identify which station (e.g., picking station 106) needs the totes, a location of the station, an urgency that the totes are needed, and so forth. Moreover, as part of receiving the request, the work manager component 134 may transmit an acknowledgment back to the requesting agent 122 or station.

At 304, the process 300 may generate a request for completing the task. For example, the task generator component 136 may generate a request for the task 116, where the request may include a task type (e.g., move totes), sources for completing the task 116 (e.g., where to pick up emptied totes), a destination for completing the task 116 (e.g., where to deliver the totes), the priority of the task 116, and/or mobility parameters within the environment 100. In some instances, the task generator component 136 may be aware of how to match the demand (e.g., the request for totes) and supply from a capability standpoint. In this sense, the task generator component 136 may understand or determine that the tasks 116 for delivering totes to the picking station 106 may be fulfilled by gathering totes at certain packaging stations 108 and/or stow stations 112.

Additionally, the task generator component 136 and/or the task manager component 138 may determine requirements associated with carrying out the task 116. For example, the task manager component 138 may determine whether certain functional characteristics, equipment, or capabilities are needed to perform the task 116.

At 306, the process 300 may determine one or more of a capability, an availability, or a location of one or more agents for completing the task 116. For example, as part of receiving the request from the task generator component 136, the task manager component 138 may operate to fulfill the request and determine compatible agents 122. In some instances, the task manager component 138 may determine the capabilities 124, the availability 126, and/or the location 128 of the agents 122 for use when selecting a particular agent for completing the task 116. Such information may be obtained by accessing the facility registry 130, receiving indications from the agent(s) 122 (e.g., location), accessing schedules of the agent(s) 122, and so forth.

The process 300 may also determine which type of agent (e.g., human or robotic) is to perform the task 116. For example, certain agents 122 may be better suited to perform certain tasks 116, and as part of determining which agent 122 is to perform the task 116, the process may determine whether a human agent or a robotic agent is to complete the task 116. From there, the process 300 may identify agents 122 of a particular type that are capable and/or able to perform the task 116.

At 308, the process 300 may rank the or more agents to complete the task. For example, based at least in part on the one or more characteristics, the capabilities 124, the availability 126, and/or the location 128 (or other characteristics), the task manager component 138 may rank the agents 122. The ranking of the agents 122 may be used for selecting a most suitable agent 122 for performing the task 116. In some instances, the agents 122 may be ranked based on an estimated time of completion, an efficiency, or the capabilities 124. For example, hardware of one robotic agent may be more capable of performing a task than hardware of another robotic agent. The task manager component 138 may also rank the agents 122 based on information about mobility parameters within the environment 100, such as vehicle locations, station status, floor traffic, zone closures, etc. within the environment 100. Moreover, as part of ranking the agents 122, the task manager component 138 may utilize the fitness function(s) 144. For example, in some instances, the task manager component 138 may utilize a time fitness function 144 for selecting an agent 122 who can most timely complete the task 116, may utilize a safety fitness function 144 for selecting an agent 122 that has a safe historical record, may utilize an experience fitness function 144 for selecting an agent 122 with the most experience. Additionally, more than one fitness function 144 may be used for selecting an agent 122. The fitness functions 144 therefore allow facilities to tailor, customize, or prioritize certain attributes or criteria utilized for selecting agents 122.

At 310, the process 300 may select, among the one or more agents, an agent to complete the task. In some instances, the task manager component 138 may select a high ranked agent for performing the task 116. In some instances, if the highest ranked agent is unavailable to perform the task 116, the task manager component 138 may select a next best or first available agent. In this process, having determined a location associated with the task 116, or the content or details of the task 116, for example, the task manager component 138 may automatically select an agent to handle the task 116. Noted above, the task manager component 138 may determine the agent 122 based on information about configurations of the agent 122, location 128, availability 126, and so forth, to determine whether the agent 122 has a status that is compatible with the task 116.

At 312, the process 300 may send an instruction to the agent to complete the task. For example, the task manager component 138 may cause an instruction to be sent to the agent 122. In the case where the agent 122 is a human agent, the instruction may be sent to the agent device(s) 132. In the case of a robotic agent, the instruction may be sent to an interface of the robotic agent that is configured to digest and decipher the task 116. In some instances, the instruction may include details of the task 116, such as where to locate the totes, a route to take and/or travel along, and so forth. In some instances, the agent 122 may also transmit an acknowledgment back to the task manager component 138 indicating that the agent 122 received the request to complete the task 116.

In some instances, if a human agent is selected for completing the task 116, the instructions (or details therein) may be different that if a robotic agent is selected. Alternatively, in some instances, if the human agent is to perform the task 116, the instruction may identify locations of equipment that the human agent is to perform. In this sense, the human agents may collaboratively work with the robotic agents for completing tasks. For example, the human agent may be instructed to load totes onto a robotic agent, and thereafter, the robotic agent may deliver the totes to the picking station 106.

At 314, the process 300 may receive a second indication that indicates a completion of the task. For example, once the totes are delivered to the picking station 106, the agent 122 at the picking station 106, the picking station 106 itself, or the agent 122 that completed the task 116 may transmit an indication of such to the task manager component 138. In response, the task 116 may be indicated as being completed, which may update the tasks 116.

As another example, using a similar process, packaging stations 108 may continuously require emptied totes to be removed. For example, after the item(s) travel to the packaging stations 108 in the totes, and after the item(s) are removed from the totes for packaging, the emptied totes may be removed. The packaging stations 108 may communicate this request to the work manager component 134 for generating a task associated with removing the emptied totes. Regardless, the fleet management system 114 may receive the tasks 116 that need to be completed across any station within the environment 100.

Figure 4:
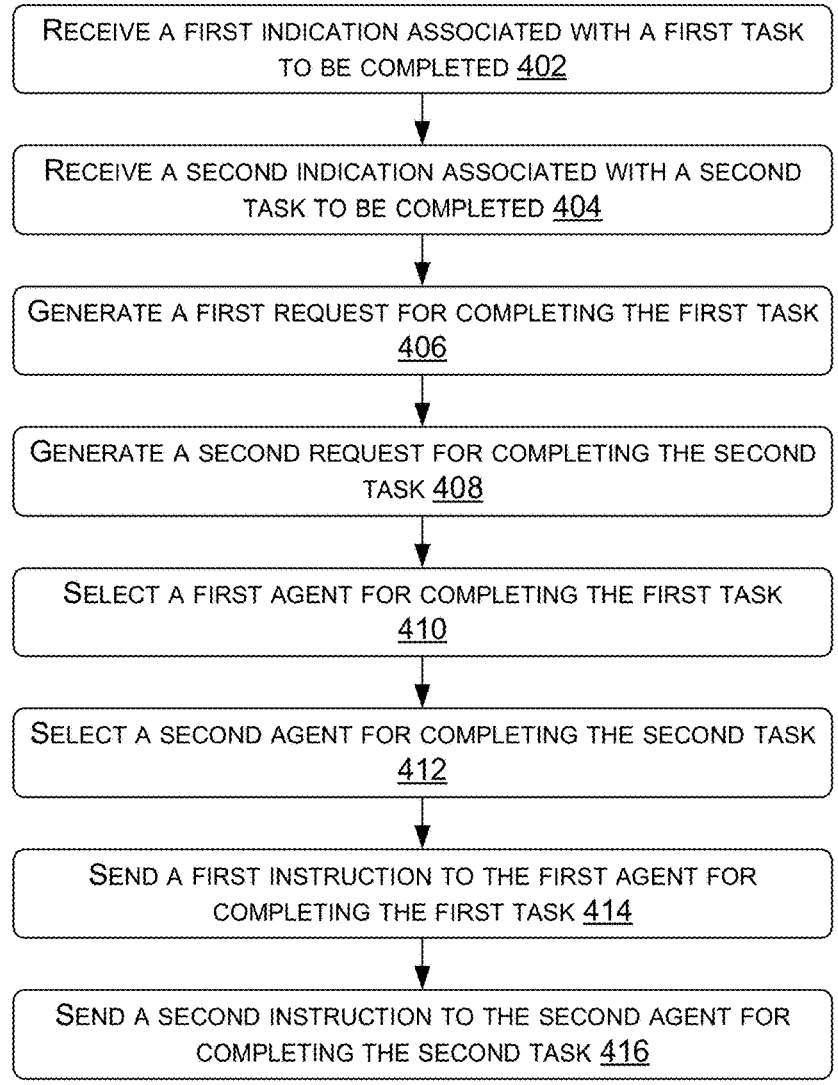
FIG. 4 illustrates an example process for selecting a first agent to perform a first task and a second agent to perform a second task, according to an embodiment of the present disclosure.

FIG. 4 illustrates an example process 400 for assigning respective tasks to multiple agents.

At 402, the process 400 may receive a first request for a first task to be completed. For example, the work manager component 134 may receive a first request from a picking station 106. In some instances, the first request may indicate resources needed (e.g., totes), a priority of the first request (e.g., priority two), and/or a location of the picking station requesting the first task.

At 404, the process 400 may receive a second request for a second task to be completed. For example, the work manager component 134 may receive a second request from a packaging station 108. In some instances, the second request may indicate resources needed (e.g., boxes), a priority of the second request (e.g., priority one), and/or a location of the packaging station requesting the second task.

At 406, the process 400 may generate a first request for completing the first task. For example, the task generator component 136 may communicate with the work manager component 134, or receive a notification of the first task, and subsequently generate the first request for completing the first task. In some instances, generating the first task may identify specifics for carrying out the first task, such as locations within the environment 100, routes to travel along, and so forth. Here, the task generator component 136 may be identify operations or acts to be carried out for performing the first task.

At 408, the process 400 may generate a second request for completing the second task. For example, the task generator component 136 may communicate with the work manager component 134, or receive a notification of the second task, and subsequently generate the second request for completing the second task. Similarly, to generate the second task, the task generator component 136 may identify specific operations for carrying out the second task.

At 410, the process 400 may select a first agent for completing the first task. For example, the task manager component 138 may receive the first request from the task generator component 136 and based on the first request (and details thereof), select the first agent for completing the first task. In some instances, the first agent may be a human agent.

At 412, the process 400 may select a second agent for completing the second task. For example, the task manager component 138 may receive the second request from the task generator component 136 and based on the second request (and details thereof), select the second agent for completing the second task. In some instances, the second agent may be a robotic agent.

In some instances, the task manager component 138 may select the first agent and the second agent, respectively, by leveraging information about station locations (e.g., picking stations 106, packaging stations 108, etc.), station statuses (e.g., number of totes, number of boxes/packaging supplies, etc.), the locations 128 of the agents 122, work allotment, fitness function(s) 144, etc. In some instances, the task manager component 138 may make optimal allocations of the tasks 116 to reduce downtime and/or efficient use of resources. For example, the task manager component 138 may determine those agents 122 that are on standby or waiting for assignments. By identifying these agents 122, the task manager component 138 is able to assign tasks 116 to increase throughput and reduce overhead expenses.

At 414, the process 400 may send a first instruction to the first agent. For example, the task manager component 138 (or interfaces of the fleet management system 114), may send the first instruction to the agent device(s) 132 notifying of the first task. The human agent, in this example, may utilize the agent device(s) 132 for understanding specifics of the first task. The perform the first task, the human agent may rely on their knowledge of the environment 100 and/or previous work history.

At 416, the process 400 may send a second instruction to the second agent. For example, the task manager component 138 (or interfaces of the fleet management system 114), may send the second instruction to the robotic agent, in this example. The robotic agent may be configured to decipher the second instruction for carrying out the second task and understanding the specifics of the second task.

In some instances, the task manager component 138 may transmit the instructions, or issue the tasks, one at a time or in batches depending on the agent 122 being selected. For example, human agents may prefer to have the multiple instructions, or tasks 116 sent at the same time, rather than one action at a time. Moreover, once the agents 122 report the completion of the task 116, the task manager component 138 may mark or indicate the first task and the second task as completed. The task manager component 138 then updates the corresponding tasks 116 for the completed actions and/or may transmit indications to the stations. For example, the task generator component may transmit indications of the completed tasks to the stations to enable the stations to update their resources (e.g., number of totes, number of boxes, etc.). Moreover, in some instances, the robotic agent may travel to a holding or waiting area while awaiting additional tasks. In some instances, the holding or waiting area may be within a confine of the workspace 104 and/or outside the confine of the workspace 104.

Although the process 400 illustrates assigning two tasks to two agents, the fleet management system 114 may process any number of requests in parallel for ensuring the timely assignment of tasks 116.

Figure 5:
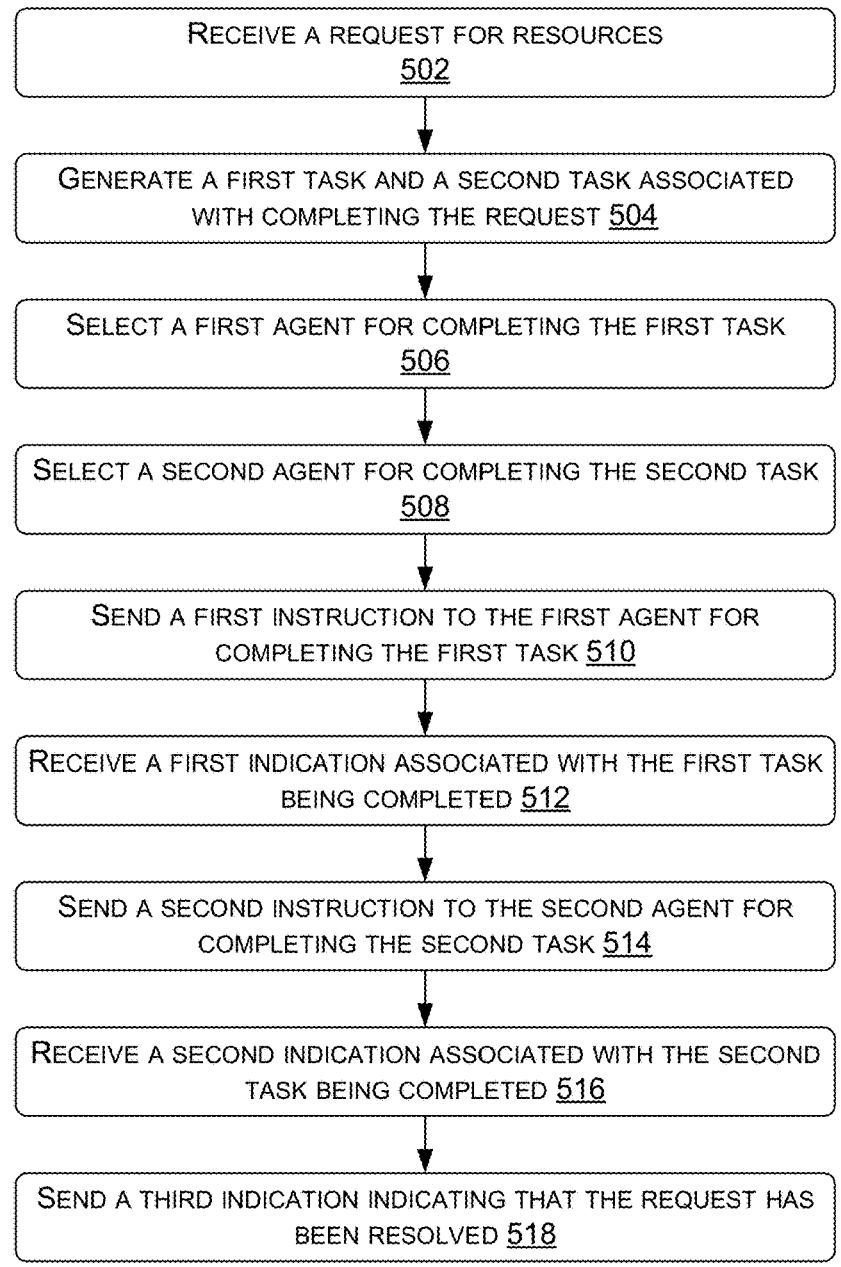
FIG. 5 illustrates an example process for receiving a request to supply resources, and determining a first task and a second task related to supplying the resources, according to an embodiment of the present disclosure.

FIG. 5 illustrates an example process 500 by which agents 122 may collaborate to fulfill a request for resources.

At 502, the process 500 may receive a request for resources. For example, the work manager component 134 may receive a request to supply totes to a picking station 106, to remove totes from a packaging station 108, to move inventory 102, and so forth.

At 504, the process 500 may generate a first task and a second task associated with completing the request. For example, the task generator component 136 may generate a first task and a second task associated with completing the request. In other words, to carry out the request, multiple tasks may be performed. For example, if the request is to supply totes to a picking station, the first task may be to load totes onto a carrier (e.g., robotic agent) and the second task may be to move the totes to the picking station.

At 506, the process 500 may select a first agent for completing the first task. For example, the task manager component 138 may select a first agent, such as a human agent, for loading the totes. In some instances, the human agent may be more adept or capable of loading the totes, as compared to a robotic agent.

At 508, the process 500 may select a second agent for completing the second task. For example, the task manager component 138 may select a second agent, such as a robotic agent, for moving the totes. In some instances, using the robotic agent to move the totes may be more efficient than instructing a human agent to perform the task. Additionally, using the robotic agents for these types of tasks (e.g., transporting) may allow human agents to perform more complicated or more involved tasks that robotic agents are not well skilled to perform. As such, the process 500 may select agents 122 based on their capableness such that task assignment may be optimized. The process 500 may also select the agents 122 based on one or more fitness function(s) 144.

At 510, the process 500 may send a first instruction to the first agent for completing the first task. For example, the task manager component 138 may cause the first instruction to be sent to the agent device(s) 132 to notify the first agent to load the totes onto the second agent.

At 512, the process 500 may receive a first indication associated with the first task being completed. For example, after the first agent completes the first task, the first agent may use the agent device(s) 132 to indicate that the first task has been completed. In some instances, the second agent may indicate that the first task has been completed (e.g., via an onboard sensor). In some instances, after the first agent loads the totes, the first agent may press a button (or other interface) on the second agent indicating that the first task has been completed.

At 514, the process 500 may send a second instruction to the second agent for completing the second task. For example, the task manager component 138 may cause the second instruction to be sent to the second agent to notify the second agent to move the totes. In some instances, the second instruction may be sent after a completion of the first task. That is, once the totes are loaded onto the second agent, the second instruction may be sent to the second agent for completing the second task. However, at the outset, a packet of instructions may be sent to the second agent informing the second agent when to perform the second task, or the operations for carrying out the second task.

In some instances, the instructions provided to human agents may be different than those instructions provided to robotic agents. For example, human agents may intuitively perform their assigned tasks 116 while robotic agents may need more detail in order to carry out their assigned tasks (e.g., raising and lowering the fork lift, raising and lowering the carriage, knowing when to raise and lower, etc.). The instructions sent to the robotic agents may also include a route along which the robotic agent is to travel to complete the task 116. In some instances, the robotic agent may utilize imaging cameras, sensors, or other navigational components to travel along the route and/or when performing the task 116.

At 516, the process 500 may receive a second indication associated with the second task being completed. For example, after delivering the totes to the picking station 106, the second agent (or an agent 122 at the picking station) may transmit (or cause) the second indication to the task manager component 138.

At 518, the process 500 may send a third indication indicating that the request has been resolved. For example, as part of the first task and/or the second task being completed, the task manager component 138 may transmit an indication to the station, the agent 122, the work manager component 134, or source requesting the resources. Such indication may update a log of resources at the station, for example. Such indication may also be used by the work manager component 134 for deleting the task 116 or marking the task 116 as completed.

As such, the process 500 illustrates an example whereby the fleet management system 114 may coordinate operation of human agents and robotic agents in completing the tasks 116. In some instances, the work manager component 134 keeps track of the totes and their locations within the environment 100 for automatically determining the tasks 116. In addition, the work manager component 134 may monitor resources at the stations and/or keep track of the locations of the resources within the environment 100.

Figure 6:
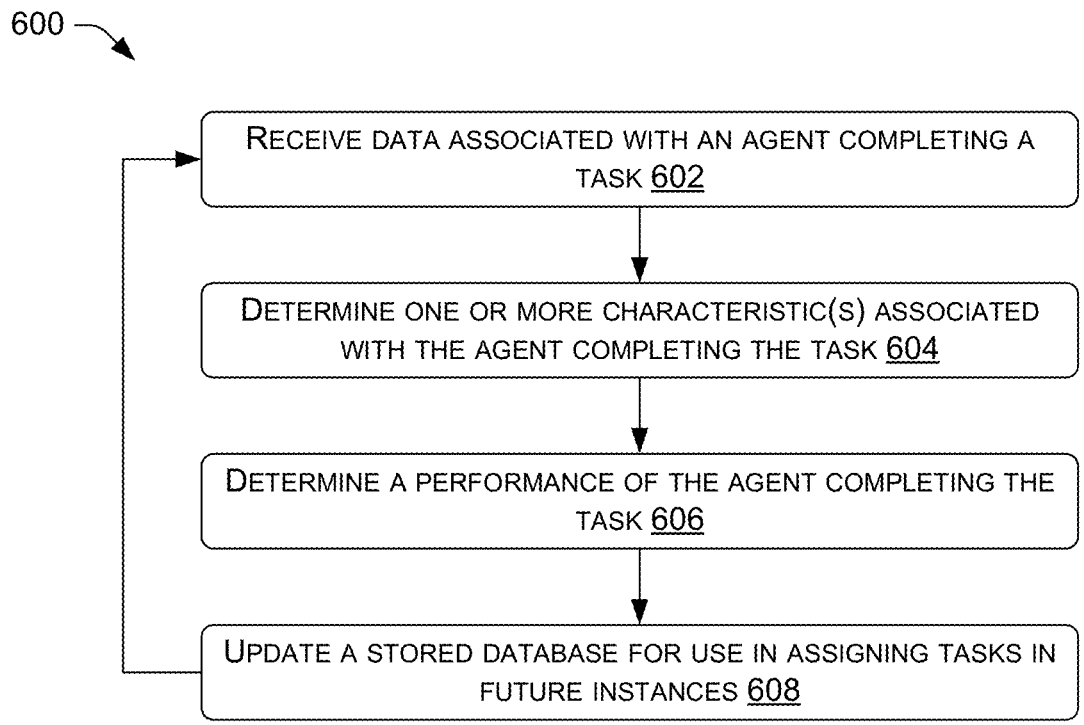
FIG. 6 illustrates an example process for determining a performance of an agent assigned to complete a task, according to an embodiment of the present disclosure.

FIG. 6 illustrates an example process 600 for updating a database for use in assigning the tasks 116. For example, as the tasks 116 are completed and carried out, the fleet management system 114 may track and/or monitor a performance of the tasks 116. Such monitoring may be used in future instances when assigning the tasks 116, for example, based on which of the agents 122 are more suited to perform the tasks 116.

At 602, the process 600 may receive data associated with an agent completing the task. For example, the data may indicate that the agent 122 completed the task 116, a time the agent 122 took to complete the task 116, a route the agent 122 took to complete the task 116, errors that occurred when completing the task 116 (e.g., miss picked item(s), improper route, etc.), and so forth. In some instances, the data may be received by the agent 122 (or agent device(s) 132), from the stations, and/or systems or devices of the environment 100 (e.g., camera/tracking system).

At 604, the process 600 may determine one or more characteristic(s) associated with the agent completing the task. The one or more characteristic(s) may be determined using the data at 602 (e.g., time took to complete the task 116).

At 606, the process 600 may determine a performance of the agent completing the task. For example, based at least in part on the one or more characteristic(s), a performance of the agent 122 may be determined. The performance, in some instances, may be a score, rating, or satisfaction used to indicate a success or performance of the agent 122 carrying out the task 116. For example, the performance may be identified as "good," "satisfactory," "poor," etc.

At 608, the process 600 may update a stored database for use in assigning tasks in future instances. For example, based on the performance, or the feedback of the agent 122 performing the task 116, the fleet management system 114 may use this information when assigning tasks 116 in future instances. For example, if a particular agent 122 performed the task 116 well, then an indication of such may be stored. Such indication may be used to select the agent 122 (or other agents 122 of the same type) in the future for carrying out the task 116, or similar tasks. However, if the feedback indicates that a particular agent did not perform the task 116 well, then the database may be updated to indicate such. In future instances, the particular agent 122 may not be selected for performing that particular task 116, or may be selected under different conditions (e.g., less time constraint to complete the task).

Figure 7:
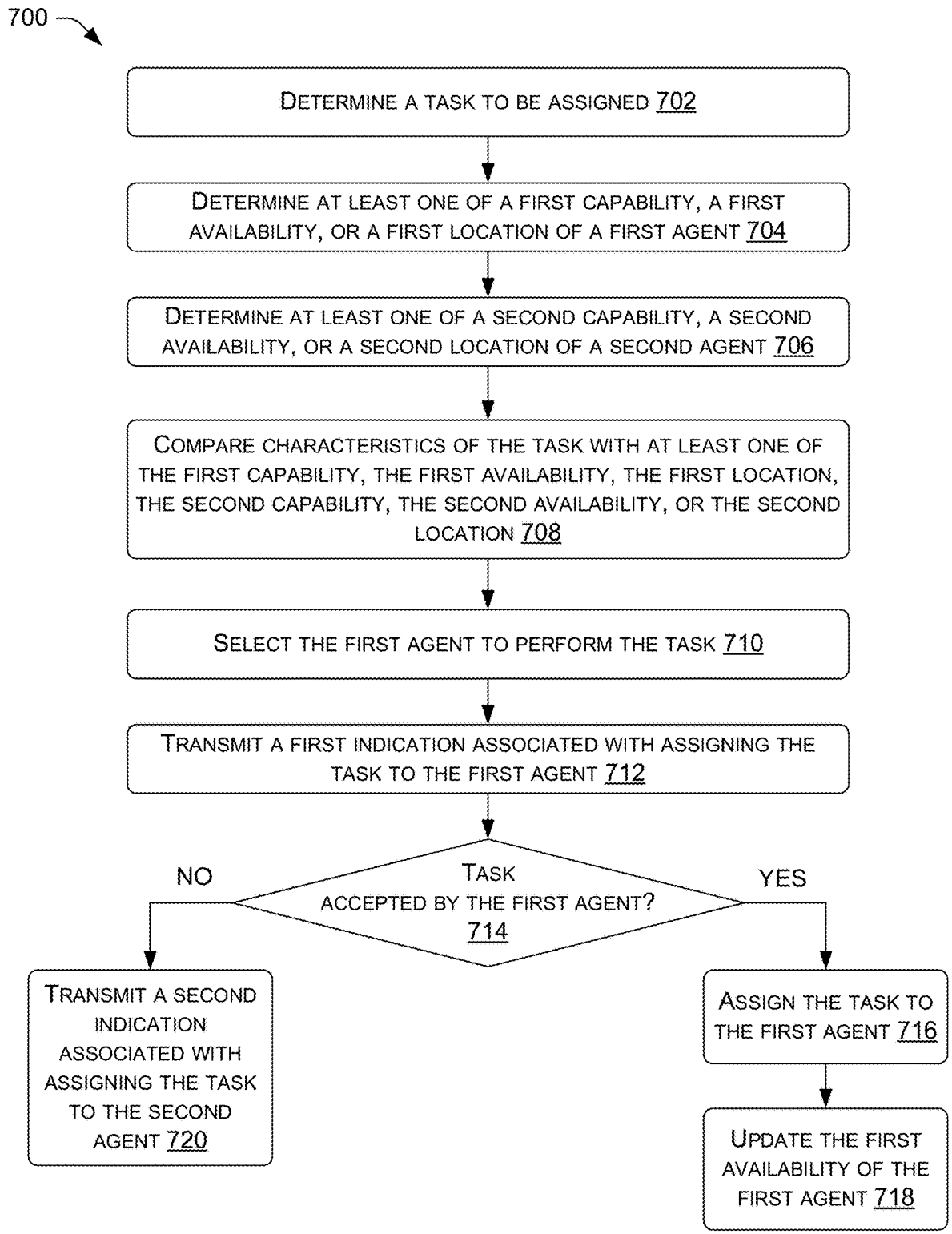
FIG. 7 illustrates an example process for selecting an agent to perform a task, according to an embodiment of the present disclosure.

FIG. 7 illustrates an example process 700 for assigning a task to an agent.

At 702, the process 700 may determine a task to be assigned. For example, the fleet management system 114 may determine a task to be completed, such as the task management component 134 receiving an indication of a task to be completed. As part of determining the task 116, the fleet management system 114 may determine specifics of the task 116 to be completed, such as locations within an environment 100 where the task 116 is to be carried, a nature of the task 116, an urgency of the task 116, and so forth.

At 704, the process 700 may determine at least one of a first capability, a first availability, or a first location of a first agent. For example, the fleet management system 114 may determine capabilities 124 of the first agent, an availability 126 of the first agent, and/or a location 128 of the first agent. In some instances, this information may be determined via accessing a database of the fleet management system 114, another communicatively coupled database, and/or via receiving indications from the first agent.

At 706, the process 700 may determine at least one of a second capability, a second availability, or a second location of a second agent. For example, the fleet management system 114 may determine capabilities 124 of the second agent, an availability 126 of the second agent, and/or a location 128 of the second agent. In some instances, this information may be determined via accessing a database of the fleet management system 114, another communicatively coupled database, and/or via receiving indications from the second agent.

At 708, the process 700 may compare characteristics of the task with at least one of the first capability, the first availability, the first location, the second capability, the second availability, and/or the second location. For example, as part of assigning the task 116 to the agents 122, the task manager component 138 may compare characteristics of the task 116 with the capabilities 124, the availability 126, and/or the location 128 of the first agent and the second agent, respectively. Such comparison identifies whether the agents 122 are compatible to perform the task 116. That is, knowing the capabilities 124, for instance, of the agents 122 allows the fleet management system 114 to determine whether certain agents are capable or incapable of performing the task 116. For example, certain robotic agents may not include the mechanical components for carrying out certain tasks 116, or human agents may be busy or preoccupied with other tasks 116.

At 710, the process 700 may select the first agent to perform the task. For example, based at least in part on the fleet management system 114 comparing the characteristics of the task 116 with the capabilities 124, the availability 126, and/or the location 128 of the first agent and the second agent, respectively, the fleet management system 114 may select the first agent. For example, the fleet management system 114 may determine that the first agent is more qualified to perform the task (e.g., higher rating, experience, etc.), has the capabilities 124 and/or availability 126 to perform the task 116, and/or is located proximate to locations associated with carrying out the task 116.

At 712, the process 700 may transmit a first indication associated with assigning the task to the first agent. For example, the fleet management system 114 may transmit an indication to the agent device 132, or directly to the agent 122 (e.g., robotic agent).

At 714, the process 700 may determine whether the task is accepted by the first agent. For example, the fleet management system 114 may determine whether an indication of the task 116 being accepted is received from the agent device 132 of the first agent, or whether the first agent has approved of the assignment. If at 714 the process 700 determines that the task 116 is accepted, the process 700 may follow the "YES" route and proceed to 716.

At 716, the process 700 may assign the task to the first agent. For example, the task manager component 138 or the fleet management system 114 may assign the task 116 to the first agent. In some instances, as a result of assigning the task 116 to the first agent, the fleet management system 114 may transmit instructions for carrying out the task to the first agent.

At 718, the process 700 may update the first availability of the first agent. For example, by assigning the task 116 to the first agent, the fleet management system 114 may update the first availability (or schedule) of the first agent. Additionally, based on the task 116 being assign to the first agent, the fleet management system 114 may determine an updated availability of the first agent (for assign future tasks).

Alternatively, if at 714 the process 700 determines that the task is not accepted by the first agent, the process 700 may follow the "NO" route and proceed to 720. At 720, the process 700 may transmit a second indication associated with assigning the task to the second agent.

Although FIG. 7 and the process 700 describes assigning the task to the first agent and/or the second agent based on receiving an indication of an acceptance of the task, in some instances, the fleet management system 114 may automatically assign the tasks 116 to the agents 122. For example, by having insight into the schedules, the capability 124, the availability 126, the location 128, and so forth, the fleet management system 114 may know those agents available and capable to carry out the task 116. This centralized management may permit the fleet management system to effectively and efficiently assign tasks 116 to agents 122.

While various examples and embodiments are described individually herein, the examples and embodiments may be combined, rearranged and modified to arrive at other variations within the scope of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The invention claimed is:

1. A system comprising:
   a database including information associated with human agents and autonomous robotic agents that are configured to perform tasks within an environment in which orders are packaged;
   one or more processors; and
   one or more non-transitory computer-readable media storing computer-executable instructions that, when executed by the one or more processors, cause the one or more processors to perform acts comprising:
   receiving a first indication associated with a task to be completed in the environment;

determining one or more first requirements associated with completing the task, the one or more first requirements including:
  capabilities associated with completing the task,
  a first time associated with completing the task, and
  one or more locations associated with completing the task;
determining, for a first agent of the human agents, a first capability to perform the task, a first availability to perform the task, and a first current location within the environment;
determining, for a second agent of the autonomous robotic agents, a second capability to perform the task, a second availability to perform the task, and a second current location within the environment;
assigning, based on the first capability, the first availability, the first current location, the second capability, the second availability, and the second current location, the task to the second agent;
sending a first instruction to the second agent that is configured to cause the second agent to perform the task, wherein the second agent includes at least one or more sensors for navigating within the environment and performing the task;
receiving, from the second agent, second data associated with one or more second requirements to complete the task;
based at least in part on the second data, sending a second instruction to the second agent that is configured to cause the second agent to perform the task;
receiving a second indication associated with the second agent completing the task;
determining a second time associated with the second agent completing the task; and
updating a performance rating of the second agent based on the second time.

2. The system of claim 1, wherein the first instruction comprises at least one of:
the one or more first requirements associated with completing the task;
a third indication to travel from the second current location to the one or more locations associated with completing the task;
a route along which to travel to complete the task; or
the first time associated with completing the task.

3. The system of claim 1, wherein the task comprises:
delivering first supplies to a first station within the environment, the first station representing a picking station where one or more items are picked from inventory in the environment; or
removing second supplies from a second station within the environment, the second station representing a packaging station where the one or more items are packaged.

4. The system of claim 1, the acts further comprising:
receiving a third indication of a second task to be completed in the environment;
determining one or more third requirements associated with completing the second task; and
assigning, based on the first capability, the first availability, and the first current location, the second task to the first agent.

5. The system of claim 1, the acts further comprising based on the second time, at least one of:
reassigning a second task assigned to the first agent to the second agent or a third agent; or
refraining from reassigning the second task.

6. A method comprising:
receiving an indication of a task to be completed within an environment;
determining one or more characteristics associated with completing the task;
determining, based at least in part on the one or more characteristics, a fitness function among a plurality of fitness functions for selecting an agent to complete the task;
identifying, within the environment, a robotic agent and a human agent capable of completing the task;
receiving first data associated with first real-time capabilities of the robotic agent to complete the task;
receiving second data associated with second real-time capabilities of the human agent to complete the task;
determining, based at least in part on the first data, one or more first capabilities of the robotic agent and a first location of the robotic agent within the environment;
determining, based at least in part on the second data, one or more second capabilities of the human agent and a second location of the human agent within the environment;
selecting the robotic agent to complete the task based at least in part on the fitness function and at least one of the one or more first capabilities, the first location, the one or more second capabilities, or the second location;
assigning the robotic agent to complete the task;
generating an instruction for the robotic agent to complete the task; and
sending the instruction to the robotic agent to complete the task, wherein the robotic agent includes one or more sensors to autonomously travel to a third location within the environment associated with the task.

7. The method of claim 6, wherein the task comprises at least one of:
moving first supplies to a fourth location within the environment;
removing the first supplies from a fifth location within the environment; or
moving second supplies to the fifth location.

8. The method of claim 7, wherein at least one of:
the first supplies comprise containers for receiving one or more items to be shipped;
the second supplies comprise one or more packaging materials;
the fourth location comprises a picking station at which the one or more items are placed into the containers; or
the fifth location comprises a packaging station at which the one or more items are removed from the containers and packaged.

9. The method of claim 6, wherein:
the one or more first capabilities comprise one or more of:
  a first weight capable of being transported by the robotic agent;
  a first volume capable of being transported by the robotic agent; or
  one or more qualifications of the robotic agent; and
the one or more second capabilities comprise one or more of:
  a second weight capable of being transported by the human agent;
  a second volume capable of being transported by the human agent;
  one or more manipulators of the human agent; or
  a driving mechanism of the human agent.

10. The method of claim 6, wherein the one or more characteristics comprise:
a weight associated with resources of the task;
a volume associated with the resources;
movement parameters to carry out the task;
a priority of completing the task; or
a time to complete the task.

11. The method of claim 6, further comprising:
determining a performance of the robotic agent completing the task;
receiving a second indication of a second task to be completed within the environment; and
selecting, based at least in part on the performance, the human agent to complete the second task.

12. The method of claim 6, wherein the instruction comprises at least one of:
one or more locations to travel to within the environment to complete the task;
one or more actions to perform at the one or more locations;
a route to travel along to complete the task; or
an amount of time the robotic agent has to complete the task.

13. The method of claim 6, further comprising:
receiving a second indication of a second task to be completed within the environment;
selecting one of the robotic agent or the human agent to complete the second task based at least in part on at least one of the one or more first capabilities, the first location, the one or more second capabilities, or the second location;
assigning the one of the robotic agent or the human agent to complete the second task; and
sending a second instruction to the one of the robotic agent or the human agent to complete the second task.

14. The method of claim 6, wherein the fitness function comprises:
a cost fitness function that selects the agent based at least in part on a cost to complete the task,
an efficiency fitness function that selects the agent based at least in part on an efficiency of the agent,
a time fitness function that selects the agent based at least in part on a time to complete the task, or
an experience fitness function that selects the agent based at least in part on an experience of the agent.

15. A system comprising:
one or more processors; and
one or more non-transitory computer-readable media storing computer-executable instructions that, when executed by the one or more processors, cause the one or more processors to perform acts comprising:
determining a first task to be completed within an environment;
determining, among a plurality of agents within the environment and based at least in part on one or more first requirements associated with the first task:
a first agent for completing the first task, the first agent representing an autonomous robot having one or more first capabilities; and
a second agent for completing the first task, the second agent representing a human having one or more second capabilities;
determining that the one or more first capabilities satisfy the one or more first requirements;
selecting the first agent for completing the first task based at least in part on the one or more first capabilities satisfying the one or more first requirements;
generating an instruction for the first agent to complete the first task, the instruction including:
a first location associated with the first task;
one or more first actions to perform at the first location;
a second location associated with the first task; and
one or more second actions to perform at the second location;
sending the instruction to the first agent, wherein the first agent includes one or more sensors for (i) traveling to the first location and performing the one or more first actions and (ii) traveling to the second location and performing the one or more second actions;
updating a database of tasks to be completed within the environment to indicate that the first agent is assigned to complete the first tasks;
receiving data associated with the first agent performing the first task; and
determining, based at least in part on the data, one or more second requirements to complete a second task, the second task being a same type of task as the first task.

16. The system of claim 15, the acts further comprising:
determining a third task to be completed within the environment, the third task being a second same type of task as the second task;
determining, based at least in part on one or more third requirements associated with the third task, a third agent for completing the third task, the third agent representing a second autonomous robot having one or more third capabilities;
receiving second data associated with the one or more second requirements to complete a second the second task;
based at least in part on the second data, determining one or more fourth requirements to complete the third task; and
determining, based at least in part on the one or more fourth requirements, among the plurality of agents within the environment associated with the third task, one of:
reassigning the third task previously assigned to the third agent to the first agent, the second agent or a fourth agent, or
refraining from reassigning the third task.

17. The system of claim 15, the acts further comprising:
determining at least one of:
a first availability of the first agent to complete the first task, or
a first location of the first agent within the environment; and
determining at least one of:
a second availability of the second agent to complete the first task, or
a second location of the second agent within the environment; and
wherein selecting the first agent is further based at least in part on the at least one of the first availability or the first location.

18. The system of claim 15, wherein the one or more first requirements comprise at least one of:
- a lifting capability;
- a carrying capacity;
- one or more actions associated with completing the first task;
- a route to travel within the environment; or
- an amount of time to complete the first task.

19. The system of claim 15, the acts further comprising:
- determining at least one fitness function for selecting an agent to complete the first task, wherein the at least one fitness function is associated with optimizing at least one of:
  - a cost to complete the first task,
  - a time to complete the first task,
  - a level of safety in completing the first task, or
  - an experience of agents completing the first task; and
- wherein selecting the first agent is further based at least in part on the at least one fitness function.

20. The system of claim 15, the acts further comprising:
- determining a third task to be completed within the environment;
- determining one or more third requirements associated with the third task;
- determining that the one or more second capabilities satisfy the one or more third requirements; and
- selecting the second agent for completing the third task based at least in part on the one or more second capabilities satisfying the one or more third requirements.

* * * * *